(12) United States Patent
Zeng et al.

(10) Patent No.: US 11,066,572 B2
(45) Date of Patent: Jul. 20, 2021

(54) METHOD OF PREPARING HIGH-PERFORMANCE WATER-SOLUBLE ACRYLIC RESIN WITH HIGH SOLID CONTENT AND LOW VISCOSITY

(71) Applicant: Institute of Applied Chemistry, Jiangxi Academy of Sceinces, Jiangxi (CN)

(72) Inventors: Guoping Zeng, Jiangxi (CN); Gang Wang, Jiangxi (CN); Lingling Wang, Jiangxi (CN); Jun Zhang, Jiangxi (CN); Jianping Fu, Jiangxi (CN)

(73) Assignee: Institute of Applied Chemistry, Jiangxi Academy of Sciences, Nanchang (CN)

( * ) Notice: Subject to any disclaimer, the term of this patent is extended or adjusted under 35 U.S.C. 154(b) by 158 days.

(21) Appl. No.: 16/532,509

(22) Filed: Aug. 6, 2019

(65) Prior Publication Data
US 2020/0040213 A1 Feb. 6, 2020

(30) Foreign Application Priority Data

Aug. 6, 2018 (CN) .......................... 201810886099.8

(51) Int. Cl.
| | | |
|---|---|---|
| C09D 153/00 | (2006.01) | |
| C08F 297/02 | (2006.01) | |
| C09D 7/63 | (2018.01) | |
| C09D 7/47 | (2018.01) | |
| C09D 7/43 | (2018.01) | |
| C09D 7/45 | (2018.01) | |
| C08F 8/32 | (2006.01) | |
| C08F 8/44 | (2006.01) | |
| C09D 7/20 | (2018.01) | |
| C08F 230/08 | (2006.01) | |
| C08F 6/10 | (2006.01) | |
| C09D 151/00 | (2006.01) | |
| C08F 265/04 | (2006.01) | |
| C08L 51/00 | (2006.01) | |

(52) U.S. Cl.
CPC .............. *C09D 153/00* (2013.01); *C08F 6/10* (2013.01); *C08F 8/32* (2013.01); *C08F 8/44* (2013.01); *C08F 230/085* (2020.02); *C08F 265/04* (2013.01); *C08F 297/026* (2013.01); *C08L 51/003* (2013.01); *C09D 7/20* (2018.01); *C09D 7/43* (2018.01); *C09D 7/45* (2018.01); *C09D 7/47* (2018.01); *C09D 7/63* (2018.01); *C09D 151/003* (2013.01); *C08F 2810/20* (2013.01); *C08F 2810/50* (2013.01)

(58) Field of Classification Search
CPC .......... C09D 7/43; C09D 7/45; C09D 153/00; C09D 7/20; C09D 151/003; C09D 7/47; C09D 7/63; C08F 8/32; C08F 6/10; C08F 8/44; C08F 297/026; C08F 265/04; C08F 230/085; C08F 2810/50; C08F 2800/20; C08L 51/003
See application file for complete search history.

(56) References Cited

FOREIGN PATENT DOCUMENTS

| CN | 102391440 B | 12/2012 |
|---|---|---|
| CN | 102718916 B | 4/2014 |
| CN | 103059313 | 12/2014 |
| CN | 105237693 B | 5/2018 |

*Primary Examiner* — Angela C Scott

(57) ABSTRACT

A preparation method and uses of a high-performance water-soluble acrylic resin with high solid content and low viscosity. The method polymerizes the free radical solution in a mixed solvent by a continuous method to produce an acrylic resin and the resin is rendered water-soluble through salification. Modification with versatate introduces a large branched structure. Silicone functional monomer is used to modify the acrylic resin. Amino resin is used as a curing agent to directly prepare a waterborne amino-acrylic coating with a simple process, and the coating has good hardness, fullness, water and alcohol resistance and salt spray resistance.

10 Claims, No Drawings

METHOD OF PREPARING HIGH-PERFORMANCE WATER-SOLUBLE ACRYLIC RESIN WITH HIGH SOLID CONTENT AND LOW VISCOSITY

CROSS-REFERENCE TO RELATED APPLICATIONS

This application claims the benefit of priority from Chinese application No. 201810886099.8, filed on Aug. 6, 2018. The content of the aforementioned application, including any intervening amendments thereto, is incorporated herein with reference in its entirety.

TECHNICAL FIELD

This application relates to waterborne industrial coatings, and more particularly to a method of preparing a high-performance water-soluble acrylic resin with high solid content and low viscosity.

BACKGROUND

Waterborne acrylic resins have been widely used in architectural latex paints and waterborne industrial coatings due to good light resistance and weatherability, light color, good heat and chemical resistance and desirable workability. However, the waterborne acrylic coating also has the defects of brittleness and undesirable water resistance. Moreover, this coating will be softened when exposed to heat.

The acrylic resin prepared by a conventional method has high solid content and viscosity, high hardness (i.e., high brittleness), good flexibility (i.e., good softness) and poor water and solvent resistance. Extensive researches have been conducted to improve the properties of acrylic resin, for example, Chinese Application Publication Nos. 201210202534 and 201110256300 respectively disclose a method for preparing a vinyl versatate-modified acetate-acrylate resin and a method of modifying an acrylic resin with a polycarbonate prepolymer to reduce the resin viscosity and improve the resin flexibility; Chinese Application Publication No. 201510744691 discloses the use of an organic-inorganic hybrid silica to modify an acrylic resin to improve the salt-spray resistance, where the modified acrylic resin has excellent corrosion resistance and salt spray resistance up to 1000 h; and Chinese Application Publication No. 201210550024 discloses that polyorganosiloxane is grafted into an acrylate segment the silicone unit and the grafted resin has high gloss and excellent weatherability. However, these methods are still limited and fail to meet the requirements of high-performance coating.

Waterborne acrylic resin coatings have defects of poor flexibility and humidity-heat resistance, which should be well overcome to prepare a high-performance water-soluble acrylic resin with high solid content and low viscosity, thereby meeting technical requirements of the high-performance waterborne industrial coatings.

SUMMARY

An object of this application is to provide a method of preparing a high-performance water-soluble acrylic resin with high solid content and low viscosity to overcome the defects in the prior art. The resin prepared by this method has excellent performance and good stability and the coating film prepared therefrom has the characteristics of good weatherability, water resistance and alcohol resistance, and high hardness, fullness and gloss.

The technical solutions of this application are described as follows.

This application discloses a method of preparing a high-performance water-soluble acrylic resin with high solid content and low viscosity, comprising:

1) adding a mixed green solvent to a reactor and heating the reactor to 80-122° C.;

2) dispersing 7-12 parts by weight of acrylic acid, 10-25 parts by weight of an acrylate, 10-20 parts by weight of styrene, 10-30 parts by weight of a methacrylate, 2-10 parts by weight of a versatate, 26-35 parts by weight of a hydroxyl-containing methacrylate, a chain transfer agent and 90% of an initiator uniformly and dropwise adding the dispersed system to the reactor; and keeping the temperature for 15-30 min; wherein the dropwise adding lasts for 3.5-5 h;

3) adding a silicone functional monomer and the mixed green solvent to the reactor; and keeping the temperature for 0.5-1 h;

4) dropwise adding the remaining 10% of the initiator and the mixed green solvent to the reactor; and keeping the temperature for 0.5-1 h, wherein the dropwise adding lasts for 10-30 min; and 5) cooling the reactor to 60° C.; and adjusting the reaction mixture to a neutralization degree of 50-80% with an amine neutralizer followed by discharging and filtration to produce the water-soluble acrylic resin with high solid content and low viscosity;

wherein the mixed green solvent is selected from alcohols, ketones, ethers and esters with azeotropic point, the same radical transfer rate and good solubility with regard to a resin; and the mixed green solvent is two solvents selected from ethanol, n-butanol, isopropanol, ethylene glycol butyl ether, propylene glycol methyl ether and propylene glycol monomethyl ether acetate;

a solvent for the initiator is one or more of ethanol, ethyl acetate, butyl acetate and isopropanol; and the reaction mixture comprises 1-6 parts by weight of the silicone functional monomer, 0.75-2.25 parts by weight of the chain transfer agent, 1.8-6.7 parts by weight of the initiator and 4.4-12 parts by weight of the amine neutralizer.

In an embodiment, the acrylate comprises one or more of ethyl acrylate, n-butyl acrylate, lauryl acrylate and 2-ethylhexyl acrylate.

In an embodiment, the methacrylate comprises one or more of isobornyl methacrylate, lauryl methacrylate, methyl methacrylate, ethyl methacrylate and n-butyl methacrylate.

In an embodiment, the versatate comprises one or more of glycidyl tert-carbonate and vinyl versatate.

In an embodiment, the hydroxyl-containing methacrylate comprises one or more of hydroxyethyl methacrylate and hydroxypropyl methacrylate.

In an embodiment, the chain transfer agent comprises one or more of 2-mercaptoethanol, 3-mercaptopropionic acid and dodecyl mercaptan.

In an embodiment, the silicone functional monomer comprises one or more of vinyltrimethoxysilane and methacryloxytrimethoxysilane.

In an embodiment, the initiator comprises one or more of benzoyl peroxide, azodiisobutyronitrile, dicumyl peroxide and di-tert-butyl peroxide.

In an embodiment, the amine neutralizer is one or more of 2-amino-2-methyl-1-propanol, N,N-dimethylethanolamine, N-methyldiethanolamine and triethanolamine.

In the preparation of this application, the versatate monomer and the acrylate monomer are mixed and continuously added dropwise to enable the uniform distribution of molecular weight of the versatate, which is conducive to improving the stability of the resin performance, preventing the large group from affecting the conversion rate and polymerization degree and producing a versatate-containing acrylate prepolymer.

The silicone functional monomer is added in the heat preservation stage to avoid the resin gelatinization caused by the hydrolysis polycondensation of silane due to the excessive heating. The silicone functional monomer should be sufficiently added to improve the film performance, but not be excessive to avoid affecting the storage stability of the resin. A silicone-containing acrylate molecular chain is thus obtained through this process.

After the prepolymer is synthesized, an amine is added for neutralization to produce a water-soluble silicone-modified versatate-containing acrylate prepolymer.

During the polymerization of monomers, acrylate monomers and the like are maintained in a low and stable concentration for dropwise-addition synthesis. The resin prepared by the invention has a small and uniformly-distributed molecular weight. Moreover, the heat release rate of the reaction can be controlled, which facilitates keeping the temperature in the reactor, so that a sharp change caused by the temperature fluctuations will not easily happen to the free radical concentration, that is, the free radical concentration becomes more stable. The silicone functional monomer is introduced by post addition, which is beneficial to produce a resin with high conversion rate and good stability.

In order to produce a high-performance resin, vinyl versatate with a reactivity ratio close to that of acrylic acid and high reactivity is used for modification, which results in high conversion rate and synthesis efficiency in the practical experiment. A double bond-containing silane coupling agent with high reactivity is selected to enable the sufficient conversion rate in a shorter period, ensuring the stability of the silicone-introduced resin performance.

In this application, nitrogen is required to be introduced to the reactor in advance to remove the air until the air is completely discharged. The large amount of oxygen in the air may inhibit the polymerization in the synthesis of the acrylic resin, which will prolong the induction period and result in more by-products and uneven heat release, adverse to the temperature control and the stability of resin performance.

The reaction time of this application is not required to be significantly prolonged. In the dropwise-addition synthesis, the acrylate monomer has a low concentration, however, in the case of increasing the monomer concentration by accelerating the dropwise addition, the molecular weight of the resin and its distribution will be affected. The molecular weight of the resin of the invention is moderate, and is not required to be reduced. Therefore, the method of this application for producing a resin will have a desirable efficiency and the entire production can be completed within 8 h.

In this application, the initiator is supplemented by uniform dropwise addition to avoid the sudden increase in the initiator content, ensuring the stability of reaction rate and temperature in the reactor and producing a more uniform and stable resin.

This application has the following beneficial effects.

This application uses a versatate to modify the acrylic resin, which improves the flexibility of the resin. Moreover, the steric hindrance of the versatate group also reduces the viscosity of the resin, so that the resin can be more easily diluted by water in the preparation of a coating, reducing the construction difficulty, the minimum film forming temperature and the use of a coalescing agent. Moreover, this process also reduces the pollution and cost and improves the gloss of the paint film. The versatate monomer can be kept in a low content by continuous dropwise addition, preventing the steric hindrance from producing a shielding effect and ensuring the normalization of the copolymerization to achieve a sufficiently high conversion rate and polymerization degree. The prepared paint film has excellent flexibility, strong impact resistance and high mechanical performance.

The versatate group used in this application for modification is introduced by continuous dropwise addition, so that the versatate monomer is always maintained in a low content and can be uniformly distributed on the molecular chain, ensuring the uniformity of the performance of the paint film.

This application uses a silicone functional monomer to modify the acrylic resin, which improves the humidity-heat resistance, chemical resistance, stain resistance, scratch resistance, handfeel and mechanical strength of the paint film. Therefore, the prepared paint film has good corrosion resistance, humidity-heat resistance, mechanical performance and salt spray resistance and high hardness.

The silicone functional monomer is introduced herein in a post-addition manner and the dropwise adding rate is controlled to maintain it in a lower content, avoiding the hydrolysis polycondensation after the copolymerization. The resin is stable during the construction and storage process and will not be hydrolyzed and gelatinized.

DETAILED OF EMBODIMENTS

This application will be further illustrated below with reference to the embodiments, but is not intended to be limited thereto.

This application discloses a preparation method and uses of a high-performance water-soluble acrylic resin with high solid content and low viscosity, and materials used in the preparation of the acrylic resin include: 7-12 parts by weight of acrylic acid, 10-25 parts by weight of n-butyl acrylate, 0-10 parts by weight of n-butyl methacrylate, 10-20 parts by weight of styrene, 10-30 parts by weight of methyl methacrylate, 1-6 parts by weight of lauryl methacrylate, 2-10 parts by weight of vinyl versatate, 26-35 parts by weight of hydroxyethyl methacrylate, 1-6 parts by weight of methacryloxypropyltrimethoxysilane, 0.75-2.25 parts by weight of a chain transfer agent, 1.8-6.7 parts by weight of an initiator and 4.4-12 parts by weight of an amine neutralizer.

The method of preparing the acrylic resin in this embodiment includes the following steps:

1) preparing a dry and clean reactor and dripping device and ensuring the smoothness of the pipeline and the normal use of meters, valves, motors, steam, water cooling, stirring, vacuum pump, nitrogen bottle;

2) adding a mixed green solvent to the reactor and heating the reactor to 80-122° C.; introducing nitrogen to the reactor until the air in the reactor is completely discharged; refluxing the mixed green solvent under heating for 20 min; and keeping the temperature in the reactor at 80-122±2° C.;

3) adding 7-12 parts by weight of acrylic acid, 10-25 parts by weight of n-butyl acrylate, 0-10 parts by weight of n-butyl methacrylate, 10-30 parts by weight of styrene, 10-30 parts by weight of methyl methacrylate, 1-6 parts by weight of lauryl methacrylate, 2-10 parts by weight of vinyl versatate, 26-35 parts by weight of hydroxyethyl methacrylate, 0.75-2.25 parts by weight of a chain transfer agent and 90% of an initiator to the dripping device; dispersing the reaction mixture uniformly under stirring to produce a clear mixed monomer, where the temperature in the reactor is controlled at 20-30° C.;

4) dropwise adding the mixed monomer to the reactor and keeping the temperature at 80-122±2° C., where the dropwise adding lasts for 3-3.5 h;

5) after the dropwise adding is completed, keeping the temperature for 15 min; and adding 1-6 parts by weight of methacryloxypropyltrimethoxysilane and 2 parts by weight of isopropanol to the dripping device followed by stirring, where the adding lasts for 15-30 min;

6) keeping the temperature for 1 h; dropwise adding the remaining 10% of the initiator and 2 parts by weight of the solvent to the dripping device followed by stirring for complete dispersion and dissolution, where the dropwise adding lasts for 0.5 h; and keeping the temperature for 1 h;

7) adding 4.4-12 parts by weight of an amine neutralizer to the dipping device to enable the resin to have a neutralization degree of 50-80%, desirable water solubility and stability; dropwise adding the amine neutralizer to the reactor after the reactor is cooled by water to be less than 60° C., where the dropwise adding lasts for 0.5 h; and continuously stirring the reaction mixture for 0.5 h; and 8) subjecting the reaction mixture to discharging and filtration to produce the water-soluble acrylic resin with high solid content and low viscosity.

The high-performance water-soluble acrylic resin with high solid content and low viscosity of this embodiment can be used in the preparation of a waterborne amino-acrylic coating, which is suitable for the coating of the substrate including metal sheets, coil aluminum materials and glass.

The method of preparing the waterborne amino-acrylic coating includes the following steps:

adding 59-65 parts by weight of the high-performance water-soluble acrylic resin with high solid content and low viscosity to a mixer followed by stirring at 800 rpm; adding 2-2.5 parts by weight of an amine neutralizer to adjust pH to 8-9 followed by stirring for 5-15 min; adding 8.2-11.8 parts by weight of an amino resin, wherein a ratio of the acrylic resin to the amino resin is 4.5-5.4:1; stirring the reaction mixture uniformly at 1,200 rpm;

adding an auxiliary consisting of 0.05-0.15 part by weight of a defoaming agent, 0.1-0.3 part by weight of a wetting agent and 0.05-0.2 part by weight of a leveling agent followed by stirring for 5-15 min; mixing 4-7 parts by weight of a coalescing agent with deionized water; cooling the coalescing agent followed by adding to the mixer; stirring the reaction mixture at 800 rpm for 5-15 min; adding 0.1-0.2 part by weight of a defoaming agent, 0-0.5 part by weight of a thickening agent under stirring at 600 rpm; and adding deionized water to obtain 100 parts by weight of the reaction mixture; and subjecting the reaction mixture to discharging, standing, filtration and heat preservation to produce the high-performance waterborne amino-acrylic coating having a high solid content and a nonvolatile matter content of 42-48%;

where the amine neutralizer is one or more of 2-amino-2-methyl-1-propanol, N,N-dimethylethanolamine, N-methyldiethanolamine and triethanolamine;

the amino resin is a partially methylated amino resin or a methylated amino resin;

the defoaming agent is one or more of BYK-024, Tego-810 and Tego-800;

the wetting agent is one or more of BYK-346 and Tego-270;

the leveling agent is one or more of BYK-333 and Tego-245;

the thickening agent is one or more of RM-8W, RM-2020, Tego-3030; and the coalescing agent is one or more of propylene glycol methyl ether, dipropylene glycol methyl ether, ethylene glycol butyl ether, diethylene glycol butyl ether, propylene glycol monomethyl ether acetate, dipropylene glycol butyl ether, dipropylene glycol ethyl ether, Texanol, ethanol and isopropanol.

The embodiments of this application are specifically described below and Examples 1-5 all refer to the preparation of a high-performance water-soluble acrylic resin with high solid content and low viscosity.

Example 1

40 parts by weight of n-butanol and 23 parts by weight of isopropanol were added to a reactor, stirred in nitrogen atmosphere and refluxed under heating, where the reaction temperature was controlled at 82±2° C. 9 parts by weight of acrylic acid, 10 parts by weight of n-butyl acrylate, 2 parts by weight of vinyl versatate, 2 parts by weight of lauryl methacrylate, 15 parts by weight of styrene, 28.5 parts by weight of methyl methacrylate, 32.5 parts by weight of hydroxyethyl methacrylate, 1.8 parts by weight of dodecyl mercaptan and 3.6 parts by weight of azodiisobutyronitrile were added to a dripping device, stirred for complete mixing and dissolution and dropwise added to the reactor, where the dropwise adding lasted for 3.5 h. The temperature of the reactor was kept for 15 min. 1 part by weight of methacryloxypropyltrimethoxysilane and 2 parts by weight of isopropanol were added to the dripping device, stirred and dropwise added to the reactor, where the dropwise adding lasted for 15 min. Then the temperature of the reactor was continuously kept for 1 h. 0.4 part by weight of azodiisobutyronitrile and 2 parts by weight of ethanol were added to the dripping device, stirred for complete mixing and dissolution and dropwise added to the reactor, where the dropwise adding lasted for 0.5 h. After the temperature of the reactor was kept for another 1 h, the reactor was stopped being heated and cooled to 60° C. by water. Then 5.6 parts by weight of N,N-dimethylethanolamine was added to the dipping device and dropwise added to the reactor, where the dropwise adding lasted for 0.5 h. The reaction mixture was continuously stirred for 0.5 h and discharged.

Example 2

40 parts by weight of propylene glycol monomethyl ether and 23 parts by weight of ethylene glycol butyl ether were added to a reactor, stirred in nitrogen atmosphere and refluxed under heating, where the reaction temperature was controlled at 91±2° C. 9 parts by weight of acrylic acid, 12 parts by weight of n-butyl acrylate, 6 parts by weight of vinyl versatate, 1 part by weight of lauryl methacrylate, 15 parts by weight of styrene, 23.5 parts by weight of methyl methacrylate, 32.5 parts by weight of hydroxyethyl methacrylate, 1.25 parts by weight of dodecyl mercaptan and 1.8 parts by weight of benzoyl peroxide were added to a dripping device, stirred for complete mixing and dissolution and dropwise added to the reactor, where the dropwise adding lasted for 3.5 h. The temperature of the reactor was kept for 15 min. 1 part by weight of methacryloxypropyltrimethoxysilane and 2 parts by weight of isopropanol were added to the dripping device, stirred and dropwise added to the reactor, where the dropwise adding lasted for 15 min. Then the temperature of the reactor was continuously kept for 1 h. 0.2 part by weight of benzoyl peroxide, 1 part by weight of ethyl acetate and 1 part by weight of isopropanol were added to the dripping device, stirred for complete mixing and dissolution and dropwise added to the reactor, where the dropwise adding lasted for 0.5 h. After the temperature of the reactor was kept for another 1 h, the reactor was stopped being heated and cooled to 60° C. by water. Then 5.6 parts by weight of N,N-dimethylethanolamine was added to the dipping device and dropwise added to the reactor, where the dropwise adding lasted for 0.5 h. The reaction mixture was continuously stirred for 0.5 h and discharged.

Example 3

40 parts by weight of n-butanol and 23 parts by weight of isopropanol were added to a reactor, stirred in nitrogen atmosphere and refluxed under heating, where the reaction temperature was controlled at 82±2° C. 9 parts by weight of acrylic acid, 16 parts by weight of n-butyl acrylate, 2 parts by weight of vinyl versatate, 1 part by weight of lauryl methacrylate, 15 parts by weight of styrene, 20.5 parts by weight of methyl methacrylate, 32.5 parts by weight of hydroxyethyl methacrylate, 2.2 parts by weight of 3-mercaptopropanol and 3.96 parts by weight of azodiisobutyronitrile were added to a dripping device, stirred for complete mixing and dissolution and dropwise added to the reactor, where the dropwise adding lasted for 3.5 h. The temperature of the reactor was kept for 15 min. 4 parts by weight of methacryloxypropyltrimethoxysilane and 2 parts by weight of isopropanol were added to the dripping device, stirred and dropwise added to the reactor, where the dropwise adding lasted for 30 min. Then the temperature of the reactor was continuously kept for 1 h. 0.44 part by weight of azodiisobutyronitrile and 2 parts by weight of ethanol were added to the dripping device, stirred for complete mixing and dissolution and dropwise added to the reactor, where the dropwise adding lasted for 0.5 h. After the temperature of the reactor was kept for another 1 h, the reactor was stopped being heated and cooled to 60° C. by water. Then 12 parts by weight of N-methyldiethanolamine was added to the dipping device and dropwise added to the reactor, where the dropwise adding lasted for 0.5 h. The reaction mixture was continuously stirred for 0.5 h and discharged.

Example 4

40 parts by weight of propylene glycol methyl ether and 23 parts by weight of ethylene glycol butyl ether were added to a reactor, stirred in nitrogen atmosphere and refluxed under heating, where the reaction temperature was controlled at 91±2° C. 7.2 parts by weight of acrylic acid, 14 parts by weight of n-butyl acrylate, 10 parts by weight of vinyl versatate, 6 parts by weight of lauryl methacrylate, 15 parts by weight of styrene, 14.3 parts by weight of methyl methacrylate, 32.5 parts by weight of hydroxyethyl methacrylate, 1 part by weight of dodecyl mercaptan and 1.8 parts by weight of benzoyl peroxide were added to a dripping device, stirred for complete mixing and dissolution and dropwise added to the reactor, where the dropwise adding lasted for 3.5 h. The temperature of the reactor was kept for 15 min. 1 part by weight of methacryloxypropyltrimethoxysilane and 2 parts by weight of isopropanol were added to the dripping device, stirred and dropwise added to the reactor, where the dropwise adding lasted for 15 min. Then the temperature of the reactor was continuously kept for 1 h. 0.2 part by weight of benzoyl peroxide, 1 part by weight of ethyl acetate and 1 part by weight of isopropanol were added to the dripping device, stirred for complete mixing and dissolution and dropwise added to the reactor, where the dropwise adding lasted for 0.5 h. After the temperature of the reactor was kept for another 1 h, the reactor was stopped being heated and cooled to 60° C. by water. Then 4.4 parts by weight of N,N-dimethylethanolamine was added to the dipping device and dropwise added to the reactor, where the dropwise adding lasted for 0.5 h. The reaction mixture was continuously stirred for 0.5 h and discharged.

Example 5

40 parts by weight of n-butanol and 23 parts by weight of isopropanol were added to a reactor, stirred in nitrogen atmosphere and refluxed under heating, where the reaction temperature was controlled at 82±2° C. 9 parts by weight of acrylic acid, 15 parts by weight of n-butyl acrylate, 6 parts by weight of n-butyl methacrylate, 10 parts by weight of vinyl versatate, 2 parts by weight of lauryl methacrylate, 15 parts by weight of styrene, 15 parts by weight of methyl methacrylate, 26 parts by weight of hydroxyethyl methacrylate, 2.2 parts by weight of 3-mercaptopropanol and 3.24 parts by weight of azodiisobutyronitrile were added to a dripping device, stirred for complete mixing and dissolution and dropwise added to the reactor, where the dropwise adding lasted for 3.5 h. The temperature of the reactor was kept for 15 min. 2 parts by weight of methacryloxypropyltrimethoxysilane and 2 parts by weight of isopropanol were added to the dripping device, stirred and dropwise added to the reactor, where the dropwise adding lasted for 20 min. Then the temperature of the reactor was continuously kept for 1 h. 0.36 part by weight of azodiisobutyronitrile and 2 parts by weight of ethanol were added to the dripping device, stirred for complete mixing and dissolution and dropwise added to the reactor, where the dropwise adding lasted for 0.5 h. After the temperature of the reactor was kept for another 1 h, the reactor was stopped being heated and cooled to 60° C. by water. Then 7.45 parts by weight of N-methyldiethanolamine was added to the dipping device and dropwise added to the reactor, where the dropwise adding lasted for 0.5 h. The reaction mixture was continuously stirred for 0.5 h and discharged.

Described in Examples 6-10 referred to the subsequent preparations of a high-performance waterborne amino-acrylic coating.

Example 6

59 parts by weight of the above-prepared acrylic resin was added to a mixer and stirred at 800 rpm. 2 parts by weight of N,N-dimethylethanolamine was added and stirred for 5-15 min for complete neutralization. 9.2 parts by weight of a partially methylated amino resin 5717 was added and stirred at 1,200 rpm. An auxiliary including 0.2 part by weight of Tego-810, 0.2 part by weight of Tego-270 and 0.1 part by weight of BYK-333 was added and stirred for 5-15 min. A coalescing agent including 3 parts by weight of dipropylene glycol methyl ether and 1 part by weight of dipropylene glycol butyl ether was mixed with 4 parts by weight of deionized water, cooled and added to the mixer followed by stirring at 800 rpm for 5-15 min. 0.2 part by weight of BYK-024, 0.1 part by weight of RM-8W, 0.1 part by weight of RM-2020 and 20.9 parts by weight of deionized water were added under stirring at 600 rpm to obtain 100 parts by weight of the reaction mixture. The reaction mixture was then sequentially subjected to discharging, standing, filtration and packaging to produce a high-performance waterborne amino-acrylic coating with a non-volatile matter content of 43±1%.

Example 7

The coating was prepared as follows. 63 parts by weight of the above-prepared acrylic resin was added to a mixer and stirred at 800 rpm. 2.1 parts by weight of N,N-dimethylethanolamine was added and stirred for 5-15 min for complete neutralization. 8.8 parts by weight of CYMEL-325 was added and stirred at 1,200 rpm. An auxiliary including 0.2 part by weight of Tego-810, 0.2 part by weight of Tego-270 and 0.1 part by weight of BYK-333 was added and stirred for 5-15 min. A coalescing agent including 2 parts by weight of propylene glycol methyl ether and 1.5 parts by weight of dipropylene glycol butyl ether was mixed with 3.5 parts by weight of deionized water, cooled and added to the mixer followed by stirring at 800 rpm for 5-15 min. 0.2 part by weight of BYK-024, 0.1 part by weight of Tego-3030 and 18.3 parts by weight of deionized water were added under stirring at 600 rpm to obtain 100 parts by weight of the reaction mixture. The reaction mixture was then sequentially subjected to discharging, standing, filtration and packaging to produce a high-performance waterborne amino-acrylic coating with a non-volatile matter content of 45±1%.

Example 8

The coating was prepared as follows. 65 parts by weight of the above-prepared acrylic resin was added to a mixer and stirred at 800 rpm. 0.9 part by weight of 2-amino-2-methyl-1-propanol was added and stirred for 5-15 min for complete neutralization. 10.5 parts by weight of a partially methylated amino resin 5717 was added and stirred at 1,200 rpm. An auxiliary including 0.1 part by weight of BYK-024, 0.15 part by weight of Tego-270, 0.3 part by weight of BYK-346 and 0.2 part by weight of BYK-333 was added and stirred for 5-15 min. A coalescing agent including 4 parts by weight of ethylene glycol butyl ether and 2 parts by weight of dipropylene glycol butyl ether was mixed with 6 parts by weight of deionized water, cooled and added to the mixer followed by stirring at 800 rpm for 5-15 min. 0.2 part by weight of BYK-024 and 10.65 parts by weight of deionized water were added under stirring at 600 rpm to obtain 100 parts by weight of the reaction mixture. The reaction mixture was then sequentially subjected to discharging, standing, filtration and packaging to produce a high-performance waterborne amino-acrylic coating with a non-volatile matter content of 47±1%.

Example 9

60 parts by weight of the above-prepared acrylic resin was added to a mixer and stirred at 800 rpm. 1.6 parts by weight of N,N-dimethylethanolamine was added and stirred for 5-15 min for complete neutralization. 10 parts by weight of a partially methylated amino resin 5717 was added and stirred at 1,200 rpm. An auxiliary including 0.1 part by weight of BYK-024, 0.1 part by weight of Tego-270, 0.2 part by weight of BYK-346 and 0.2 part by weight of BYK-333 was added and stirred for 5-15 min. A coalescing agent including 3 parts by weight of diethylene glycol ethyl ether, 1 part by weight of dipropylene glycol butyl ether and 1 part by weight of Texanol was mixed with 5 parts by weight of deionized water, cooled and added to the mixer followed by stirring at 800 rpm for 5-15 min. 0.2 part by weight of BYK-024 and 17.6 parts by weight of deionized water were added under stirring at 600 rpm to obtain 100 parts by weight of the reaction mixture. The reaction mixture was then sequentially subjected to discharging, standing, filtration and packaging to produce a high-performance waterborne amino-acrylic coating with a non-volatile matter content of 44±1%.

Example 10

61 parts by weight of the above-prepared acrylic resin was added to a mixer and stirred at 800 rpm. 2 parts by weight of 2-amino-2-methyl-1-propanol was added and stirred for 5-15 min for complete neutralization. 10 parts by weight of a partially methylated amino resin 5717 was added and stirred at 1,200 rpm. An auxiliary including 0.1 part by weight of BYK-024, 0.1 part by weight of Tego-270, 0.2 part by weight of BYK-346 and 0.2 part by weight of BYK-333 was added and stirred for 5-15 min. A coalescing agent including 4 parts by weight of propylene glycol methyl ether and 0.5 part by weight of dipropylene glycol butyl ether was mixed with 4.5 parts by weight of deionized water, cooled and added to the mixer followed by stirring at 800 rpm for 5-15 min. 0.2 part by weight of BYK-024, 0.2 part by weight of Tego-3030 and 17 parts by weight of deionized water were added under stirring at 600 rpm to obtain 100 parts by weight of the reaction mixture. The reaction mixture was then sequentially subjected to discharging, standing, filtration and packaging to produce a high-performance waterborne amino-acrylic coating with a non-volatile matter content of 45±1%.

The acrylic resins prepared in Examples 1-5 and the amino-acrylic coatings prepared in Examples 6-10 were tested for physicochemical performances, where the test methods were respectively referred to Part 1 (visual observation) of GB/T 9282.1-2008 "Clear liquids-Estimation of color by the platinum-cobalt scale", GB/T 1721-2008 "Determination of appearance and transparency of varnishes, boiled oils and thinners", GB/T 1722-1992 "Estimation of color of varnishes, boiled oils and thinners", GB/T 1723-1993 "Determination of viscosity of coatings", GB/T1724-1979 "Methods of test for fitness of grind of paints", GB/T 10247-2008 "Methods of viscosity measurement", GB/T 1725-2007 "Paints, varnishes and plastics-Determination of non-volatile-matter content", GB/T 6743-1986 "Binders for paints and varnishes-Determination of Acidity-Titrimetric method" and GB/T 9736-2008 "Chemical reagent-General method for the determination of acidity and alkalinity".

Performances of the water-soluble acrylic resins prepared in Examples 1-5 were shown in Table 1.

TABLE 1

Test results of performances of water-soluble acrylic resins

| Items | Results | Test method |
| --- | --- | --- |
| Appearance (Visual observation) | Transparent clear liquid | GB/T 1721-2008 |
| Color mark (Fe—Co colorimetric method) | ≤7# | GB/T 1722-1992 |
| Fitness (Squeegee fitness gauge) | ≤5 um | GB/T 1724-1979 |
| Non-volatile matter content | 60 ± 2% | GB/T 1725-2007 |
| Viscosity (Rotary viscosity at 25° C.) | 4000-7000 mpa · s | GB/T 1723-1993 |
| Acidity (Titrimetric method) | 32-40 mgKOH/g | GB/T 6743-1986 |

The preparation of the paint film met the standards of HG/T4758-2014 "Waterborne acrylic resin coating". The coating prepared as above was diluted by some water or ethanol to the application viscosity. A 1000 mesh-polished tinplate was wiped, sprayed for a dry film thickness of 25-30 μm, leveled by standing at room temperature in a dust-free area for 5 min, baked at 160° C. for 20 min, cooled at room temperature to eliminate stress and measured for the film performance after 5 h.

The test methods were respectively referred to GB/T10125-1997 "Corrosion tests in artificial atmospheres-Salt spray tests", GB 6742-2007-T "Paints and varnishes-Bend test (cylindrical mandrel)", GB/T 1723-1993 "Determination of viscosity of coatings", GB/T 10247-2008 "Methods of viscosity measurement", GB/T 6739-2006 "Paints and varnishes-Determination of film hardness by pencil test", GB9286-1998 "Paints and varnishes-Cross cut test for films", GB-T 1732-1993 "Determination of impact resistance of film" and GB 1763-1979 "Determination of chemical resistance of film".

Performances of the waterborne amino-acrylic coatings prepared in Examples 6-10 were shown in Table 2.

TABLE 2

Test results of performances of waterborne amino-acrylic coatings

| Items | Results | Test methods |
|---|---|---|
| Viscosity (Iwata cup #2) | 19-25 s | GB/T1723-1993 |
| Fitness (Squeegee fitness gauge) | ≤15 um | GB/T1724-1979 |
| Film appearance (visual observation) | Normal | |
| Film thickness (Magnetic film thickness gauge) | 25-35 um | |
| Glossiness (Vancometer) | >90° | GB/T 9754-2007 |
| Adhesion (Cross-cut test) | ≤1 level | GB/T 9286-1998 |
| Hardness (Pencil hardness) | ≥2 H | GB/T 6739-2006 |
| Impact resistance | ≥50 kg · cm | GB/T 1732-1993 |
| Bend test | ≤2 mm | GB 6742-2007 |
| Water resistance | ≥240 h | GB/T 1733-1993 |
| Salt spray resistance | ≥200 h | GB/T 10125-1997 |
| Ethanol resistance | >300 times | GB 1763-1979 |

The above embodiments are merely preferred embodiments of the invention, and are not intended to limit the invention. Any variations, modifications, substitutions, combinations and simplifications made without departing from the spirit of the invention should be considered as equivalent replacements of the invention and thus should fall within the scope of the invention.

What is claimed is:

1. A method of preparing a water-soluble acrylic resin, comprising:
    1) adding a mixed green solvent to a reactor and heating the reactor to 80-122° C.;
    2) dispersing 7-12 parts by weight of acrylic acid, 10-25 parts by weight of an acrylate, 10-20 parts by weight of styrene, 10-30 parts by weight of a methacrylate, 2-10 parts by weight of a versatate, 26-35 parts by weight of a hydroxyl-containing methacrylate, a chain transfer agent and 90% of an initiator uniformly to produce a dispersed system and dropwise adding the dispersed system to the reactor, wherein the dropwise addition lasts for 3.5-5 h; and after the dropwise addition is completed keeping the temperature at 80-122° C. for 15-30 min;
    3) adding a silicone functional monomer and a solvent to the reactor; and keeping the temperature at 80-122° C. for 0.5-1 h;
    4) dropwise adding the remaining 10% of the initiator and a solvent to the reactor to obtain a reaction mixture, wherein the dropwise addition lasts for 10-30 min; and after the dropwise addition is completed, keeping the temperature at 80-122° C. for 0.5-1 h; and
    5) cooling the reactor to 60° C.; and adjusting the reaction mixture to a neutralization degree of 50-80% with 4.4-12 parts by weight of an amine neutralizer followed by discharging and filtration to produce the water-soluble acrylic resin;
    wherein the mixed green solvent is two solvents selected from ethanol, n-butanol, isopropanol, ethylene glycol butyl ether, propylene glycol methyl ether and propylene glycol monomethyl ether acetate;
    the solvent in step (3) is isopropanol;
    the solvent in step (4) is one or more of ethanol, ethyl acetate, butyl acetate and isopropanol; and
    the reaction mixture comprises 1-6 parts by weight of the silicone functional monomer, 0.75-2.25 parts by weight of the chain transfer agent, and 1.8-6.7 parts by weight of the initiator.

2. The method of claim 1, wherein the acrylate comprises one or more of ethyl acrylate, n-butyl acrylate, lauryl acrylate and 2-ethylhexyl acrylate.

3. The method of claim 1, wherein the methacrylate comprises one or more of isobornyl methacrylate, lauryl methacrylate, methyl methacrylate, ethyl methacrylate and n-butyl methacrylate.

4. The method of claim 1, wherein the versatate comprises one or more of glycidyl tert-carbonate and vinyl versatate.

5. The method of claim 1, wherein the hydroxyl-containing methacrylate comprises one or more of hydroxyethyl methacrylate and hydroxypropyl methacrylate.

6. The method of claim 1, wherein the chain transfer agent comprises one or more of 2-mercaptoethanol, 3-mercaptopropionic acid and dodecyl mercaptan.

7. The method of claim 1, wherein the silicone functional monomer comprises one or more of vinyltrimethoxysilane and methacryloxytrimethoxysilane.

8. The method of claim 1, wherein the initiator comprises one or more of benzoyl peroxide, azodiisobutyronitrile, dicumyl peroxide and di-tert-butyl peroxide.

9. The method of claim 1, wherein the amine neutralizer is one or more of 2-amino-2-methyl-1-propanol, N,N-dimethyl ethanol amine, N-methyldiethanolamine and triethanolamine.

10. A method of preparing a waterborne amino-acrylic coating, comprising:
    adding 59-65 parts by weight of the acrylic resin prepared by the method of claim 1 to a mixer; stirring the acrylic resin at 800 rpm; and adding 2-2.5 parts by weight of an amine neutralizer to adjust pH to 8-9 followed by stirring for 5-15 min;
    adding 8.2-11.8 parts by weight of an amino resin followed by stirring uniformly at 1,200 rpm, wherein a ratio of the acrylic resin to the amino resin is 4.5-5.4:1;
    adding an auxiliary comprising 0.05-0.15 part by weight of a defoaming agent, 0.1-0.3 part by weight of a wetting agent and 0.05-0.2 part by weight of a leveling agent followed by stirring for 5-15 min; mixing 4-7 parts by weight of a coalescing agent with deionized water; cooling the coalescing agent and adding the coalescing agent to the mixer followed by stirring at 800 rpm for 5-15 min;
    adding 0.1-0.2 part by weight of a defoaming agent, 0-0.5 part by weight of a thickening agent under stirring at 600 rpm; and adding deionized water to the mixer to obtain 100 parts by weight of a reaction mixture; and subjecting the reaction mixture to discharging, standing, filtration and heat preservation to produce the waterborne amino-acrylic coating having a nonvolatile matter content of 42-48%;
    wherein the amine neutralizer is one or more of 2-amino-2-methyl-1-propanol, N,N-dimethylethanolamine, N-methyldiethanolamine and triethanolamine;
    the amino resin is a partially methylated amino resin or a methylated amino resin;
    the coalescing agent is one or more of propylene glycol methyl ether, dipropylene glycol methyl ether, ethylene glycol butyl ether, diethylene glycol butyl ether, propylene glycol monomethyl ether acetate, dipropylene glycol butyl ether, dipropylene glycol ethyl ether, 2,2,4-Trimethyl-1,3-pentanediol monoisobutyrate, ethanol and isopropanol.

* * * * *